United States Patent [19]
DeFouw et al.

[11] Patent Number: 5,129,835
[45] Date of Patent: Jul. 14, 1992

[54] POWER PANEL STRUCTURE

[75] Inventors: Jerry A. DeFouw, Grand Rapids; James H. Nienhuis, Wyoming; Jeffrey L. Clark, Holland; Bruce R. Gezon, Caledonia, all of Mich.

[73] Assignee: Herman Miller, Inc., Zeeland, Mich.

[21] Appl. No.: 585,248

[22] Filed: Sep. 19, 1990

[51] Int. Cl.$^5$ .............................................. H01R 4/60
[52] U.S. Cl. ..................................... 439/215; 439/211
[58] Field of Search ............... 439/120, 200, 209, 211, 439/212, 215; 179/48, 49

[56] References Cited

U.S. PATENT DOCUMENTS

| | | |
|---|---|---|
| 3,742,674 | 7/1973 | Lang . |
| 3,814,833 | 6/1974 | Yamada et al. . |
| 3,823,251 | 7/1974 | Heithecker et al. . |
| 3,856,981 | 12/1974 | Boundy . |
| 3,889,044 | 6/1975 | Flachbarth et al. . |
| 4,060,294 | 11/1977 | Haworth et al. . |
| 4,199,206 | 4/1980 | Haworth et al. . |
| 4,349,995 | 9/1982 | Dowler et al. . |
| 4,351,475 | 9/1982 | Hudson . |
| 4,353,411 | 10/1982 | Harter et al. . |
| 4,360,705 | 11/1982 | Rogers . |
| 4,367,370 | 6/1987 | Wilson et al. . |
| 4,406,101 | 9/1983 | Heidmann ................. 439/209 X |
| 4,408,543 | 10/1983 | Griffin . |
| 4,451,108 | 5/1984 | Skidmore .................. 439/536 |
| 4,457,116 | 7/1984 | Kump . |
| 4,475,322 | 10/1984 | Russo et al. . |
| 4,596,098 | 6/1986 | Finkbeiner et al. .......... 439/209 X |
| 4,685,255 | 8/1987 | Kelley . |
| 4,713,918 | 12/1987 | Cioffi . |
| 4,716,698 | 1/1988 | Wilson et al. . |
| 4,762,072 | 8/1988 | Boundy et al. . |
| 4,795,355 | 1/1989 | Dorn et al. ................. 439/215 |
| 4,875,880 | 10/1989 | Welch et al. ................ 439/536 |
| 4,918,886 | 4/1990 | Benoit et al. . |

FOREIGN PATENT DOCUMENTS

| | | |
|---|---|---|
| 0174500 | 3/1986 | Fed. Rep. of Germany . |
| 943304 | 3/1949 | France . |
| 2059183A | 4/1981 | United Kingdom . |
| 2155252A | 9/1985 | United Kingdom . |

OTHER PUBLICATIONS

Steelcase Secification Guide—Jun., 1990, pp. 120-123,128,129.
Steelcase Product Guide—Jun. 1990, pp. 56-59.

*Primary Examiner*—Eugene F. Desmond
*Attorney, Agent, or Firm*—Varnum, Riddering, Schmidt & Howlett

[57] ABSTRACT

A power panel for use with wall panels of a space-divider system includes a lightweight frame structure having vertically extending end plates and a central web. Front and rear spaces are defined on either side of the web to accommodate electrical and communication wiring and receptacles on both the front and the back of the panel. A rib, extending from the web, divides the front and rear areas and provides physical separation between electrical power and communication wiring. The portion of the web on one side of the rib has an offset curved section to accommodate electrical wiring conduits extending vertically from the top to the bottom of the power panel. The power panel includes an upper area, with a removable cover, above the upper edge of the frame structure to accommodate wiring to and from, and between wall panels adjoining the power panel. A U-shaped cover is removably attached to the lower edge of the frame structure to accommodate wiring to and from, and between, panels adjoining the power panel. Snap-fit removable covers are attached to the front and back of the frame structure. The removable front and back covers and removable upper and lower covers provide easy access to the wiring in the power panel, which accommodates wiring in both the horizontal and vertical direction. The power panel accommodates receptacles on both the front and back in a back-to-back relationship, without increasing the thickness of the power panel beyond that of the standard wall panel, thereby providing an aesthetically pleasing arrangement.

30 Claims, 8 Drawing Sheets

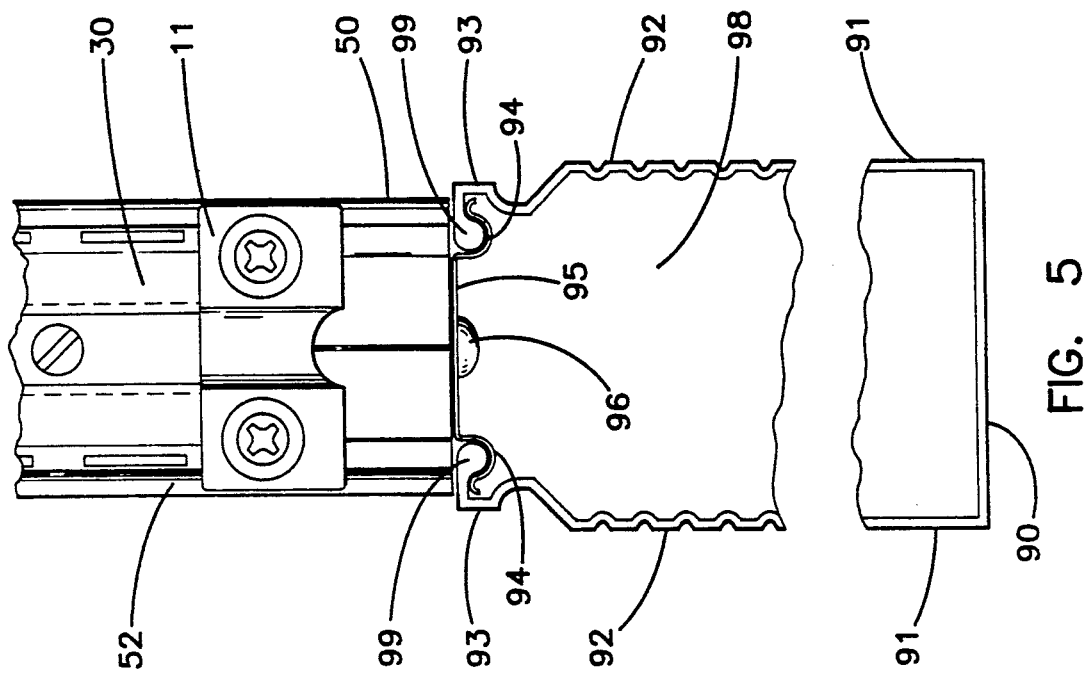
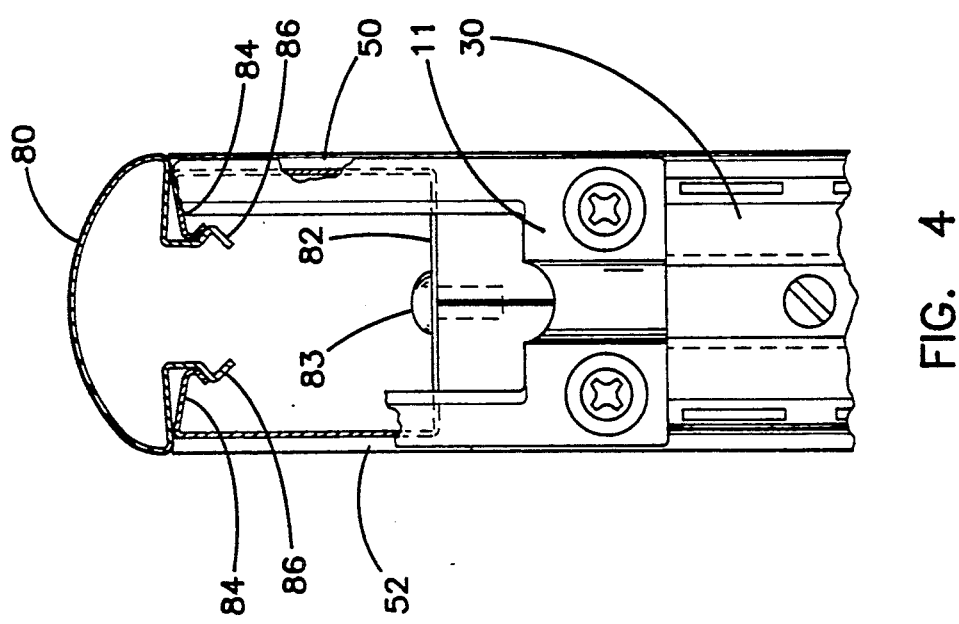

POWER PANEL STRUCTURE

BACKGROUND OF THE INVENTION

1. Field of the Invention

The invention relates to work space divider systems employing rearrangeable wall panels and more particularly to power panels for providing electrical power and communications access to work areas defined by wall panels.

2. State of the Prior Art

Space-divider systems employing interconnected rearrangeable wall panels to define work areas are in common use. One advantage of such systems is that open areas may be divided into individual work spaces which may be readily reconfigured by rearrangement of the wall panels to meet the dynamic demands of the work place. A significant problem in such systems, however, is the provision of electrical power and communication connections. The modern work place utilizes many and varied devices such as computer terminals, printers, telephones, telecopiers, computer network connections, etc., which require both electrical and communication connections. In order to allow utilization of such devices, both electrical and communication receptacles are required at various positions in the work spaces created by space-divider wall panels. Changing demands of the workplace often require rearrangement of power and communication outlets and wiring. Hence, ready access to wiring interior to the wall panels is desirable. Furthermore, because of the greater demand for computer ports and electrical power, more connections to the wall panels are required. It is therefore desirable to be able to provide communication access and electrical power-feed connections at a plurality of positions in a space-divider system. Furthermore, it is desirable to provide electrical outlet receptacles at waistline level, above the work surface level, as well as at the baseline of the wall panels, where required. Preferably, electrical and communication receptacles are provided only where needed without modification of standard wall panels in order to avoid production and inventory of a variety of special-function wall panels. Furthermore, receptacles are preferably provided on both sides of the space-divider panels for use in work spaces defined by opposite sides of the panels, and are preferably positioned at like elevations on the front and back of the panels for aesthetic purposes.

Certain prior art space-divider systems have electrical outlets inconveniently located only along the baseline of the wall panels where they are often difficult to reach. In other wall panel systems, the electrical outlets are distributed at various positions in the wall panels. The following are examples of prior art systems.

U.S. Pat. No. 3,823,251 to Heithecker et al. (issued Jul. 9, 1974) discloses an interior wall panel which is provided with a plurality of vertically extending hollow channels, formed integral to the wall panel, for receiving electrical wiring. The channels are provided with channel cover securing clips for engaging a channel cover and electrical switch box clips for supporting electrical outlet receptacles and the like at various elevations. One significant disadvantage of the Heithecker arrangement is that special channels have to be formed in the wall panels and covers have to be provided independent of whether electrical outlets or wiring is needed at the location defined by the channels. Another disadvantage of the Heithecker arrangement is that special clips have to be installed in the channels at the location where an electrical outlet is desired and covers of various sizes are required to accommodate receptacles at various elevations.

U.S. Pat. No. 4,349,995 to Dowler et al. (issued Sep. 21, 1982) discloses interlocking panels wherein electrical elements and plumbing elements are installed as required for a particular installation. Such an arrangement has the distinct disadvantage of not lending itself to mass production in which all panels are made identical in order to reduce costs.

U.S. Pat. No. 4,685,255 to Kelley (issued Aug. 11, 1987) assigned to the assignee hereof, discloses a work space management system using modular panels provided with electrical wiring channels at waistline and baseline elevations, and convenience outlets disposed at various locations along the horizontally-extending channels. Removable cover panels attach to the frames by means of cover-retaining flanges.

U.S. Pat. No. 3,856,981 to Boundy (issued Dec. 24, 1974) discloses a power panel for use with a space-divider wall panel system containing electrical and telephone wires and receptacles accessible from one side of the panel only. An electrical service box, in which electrical outlets are supported, is provided in the structural framework of the power panel and is formed by means of U-shaped steel channel members in the lower portion of the power panel. The power panel is provided with edge rails for connection to adjacent space-divider panels. One disadvantage of the power panel disclosed in this patent is the relatively expensive power box arrangement and the lack of convenient access to the interior of the panel for wiring purposes.

Accordingly, one problem of prior art systems is that in most systems some customization of basic wall panels is required to provide electrical outlets. A further disadvantage of the prior art systems, generally, is lack of conveniently positioned receptacles on both sides of panels of standard widths and lack of flexibility of positioning of receptacles without modification of the wall panels. A further problem in prior art space-management systems using rearrangeable wall panels is the lack of adequate facilities for extending electrical conduits between baseline service raceways and ceiling-provided electrical power-feed connections.

SUMMARY OF THE INVENTION

These and other problems of the prior art are overcome in accordance with this invention by means of a power panel which may be conveniently incorporated at various locations in a wall panel space-divider system. The power panel comprises a frame structure and front and rear panel covers supported on the structure. The frame structure comprises a pair of vertically extending end plates and a centrally disposed interconnecting web extending between the end plates. Front and rear spatial areas are defined between the web and the front and rear panel covers, respectively, for accommodating electrical outlet receptacles in the front and rear spatial areas. Advantageously, the electrical receptacles may be supported on the frame structure in a back-to-back relationship. The web is further provided with a rib member extending to the panel covers, thereby dividing the front and rear inner spatial areas each into a pair of physically separate inner spatial areas, with electrical outlet receptacles disposed on one side of the rib member and communication receptacles disposed on the other side of the rib member. Advantageously, the power panel in accordance with this invention may be used to provide electrical power and communication connections at various vertical elevations on one or both sides of the power panel without increasing the thickness of the power panel beyond the thickness of a standard wall panel. Furthermore, the rib member advantageously separates electrical supply wiring from the communication wiring. The frame structure is further provided with standard slotted rail and attachment devices for supportive attachment to adjacent wall panels on one or both sides of the power panel. Advantageously, the power panels may be conveniently attached to one or both sides of any wall panel at a position where an electrical or communication receptacle is desirable without modification to the standard wall panels. It is another advantage of the power panel in accordance with this invention that the standard slotted rails may be used for supporting a work surface to form a continuous work surface with adjacent wall panels.

In accordance with one particular aspect of the invention, at least a portion of the web includes an offset section to accommodate one or more vertically extending electrical cables or conduits having an exterior dimension greater than normally available between a centrally disposed web and the outer wall of a wall panel of standard thickness. In one embodiment, the offset section is a curved S-shaped section. Advantageously, the offset web section allows the use of greater diameter conduits within the wall panels to accommodate a larger number of electrical wires in the conduits without increasing the thickness of the power panel and maintaining the pleasing aesthetics of a wall area of uniform thickness. In one embodiment of the invention, the panel covers are provided with designated areas for accommodating communication receptacles and the offset section of the web is provided with openings in alignment with the designated areas to avoid interference with the receptacles.

The interconnecting web in one embodiment of the invention is provided with an opening in register with electrical outlet receptacle openings in the panel covers. A Y-shaped connector assembly engages one edge of the web opening, supports an outlet receptacle block on each side of the web, and is provided with electrical terminals for engaging terminals of outlet receptacle blocks.

In accordance with one aspect of the invention, front and rear power panel covers are removably supported on the frame structure by cover-retaining flanges formed integral with the rib member and end plates of the structure. Each cover is provided with flanges and spring clips for engaging the flanges on the end plates and the rib member. A plurality of covers are provided to be used interchangeably for different applications. Each cover has a vertically extending marked section with visually discernable markings to identify the function of a portion, e.g., the electrical power portion, of the power panel. Certain of the covers have openings to accommodate receptacles, and the marked section is discontinuous at the openings. Other covers do not have openings, and the marked section is continuous over the length of these panels. Advantageously, this arrangement provides a cost-effective power panel structure with function-identifying covers which are readily removable to provide a lay-in capability for electrical and communication wiring, both for initial installation and later rearrangement.

The interconnecting web of the frame structure is provided with an enlarged section adjacent the end plates to accommodate fasteners used for the attachment of slotted rails to the outside of the end plates. The enlarged sections allow fasteners to extend through the end plates and into enlarged sections to assure a secure attachment. By means of the slotted rails and standard connectors, the power panel may be readily attached to adjacent wall panels.

Advantageously, the power panel is provided with an upper spatial area for accommodating electrical and/or communication wiring disposed above the frame structure. In one embodiment of the invention, the upper spatial area is defined by a U-shaped support bracket attached to the upper edge of the frame by means of screws extending into the enlarged sections of the web adjacent the end plates. The U-shaped bracket has upwardly extending side walls and a top opening and is provided with cover-engaging flanges for retaining a top cover for covering the upper spatial area. In another embodiment, an upper portion of each of the two end plates, extending above the upper edge of the interconnection web, is provided with a U-shaped opening to accommodate wiring extending along the upper portion of adjacent wall panels or power poles and into or across the power panel.

A lower bracket, provided with cover-engaging spring clips, is attached to the lower edge of the frame by means of screws extending into enlarged sections of the web adjacent the end plates. A generally U-shaped bottom cover, which covers a lower spatial area, below the interconnecting web, for containing electrical and communication wires, is provided with flanges which engage the spring clips of the lower bracket. An electrical junction block may be disposed in the lower spatial area for connection to electrical conduits from adjacent wall panels or power poles, thereby providing an electrical connection between adjacent panels and to electrical outlets in the power panel. The upper and lower spatial areas and vertically extending spatial areas provide a convenient interface with a power pole for the distribution of power and communication wiring.

Advantageously, the arrangement in accordance with this invention provides a flexible, convenient power panel. The frame structure may advantageously be manufactured in a cost-effective manner as an extruded aluminum structure having flanges and protuberances formed integral to the structure.

BRIEF DESCRIPTION OF THE DRAWING

An illustrative embodiment of the invention is described in the following detailed description, with reference to the drawing in which:

FIG. 4 is an enlarged fragmentary left side elevation of the upper portion of the power panel of FIG. 2;

FIG. 5 is an enlarged fragmentary left side elevation of the lower portion of the power panel of FIG. 2;

DETAILED DESCRIPTION OF THE PREFERRED EMBODIMENT

Figure 1:
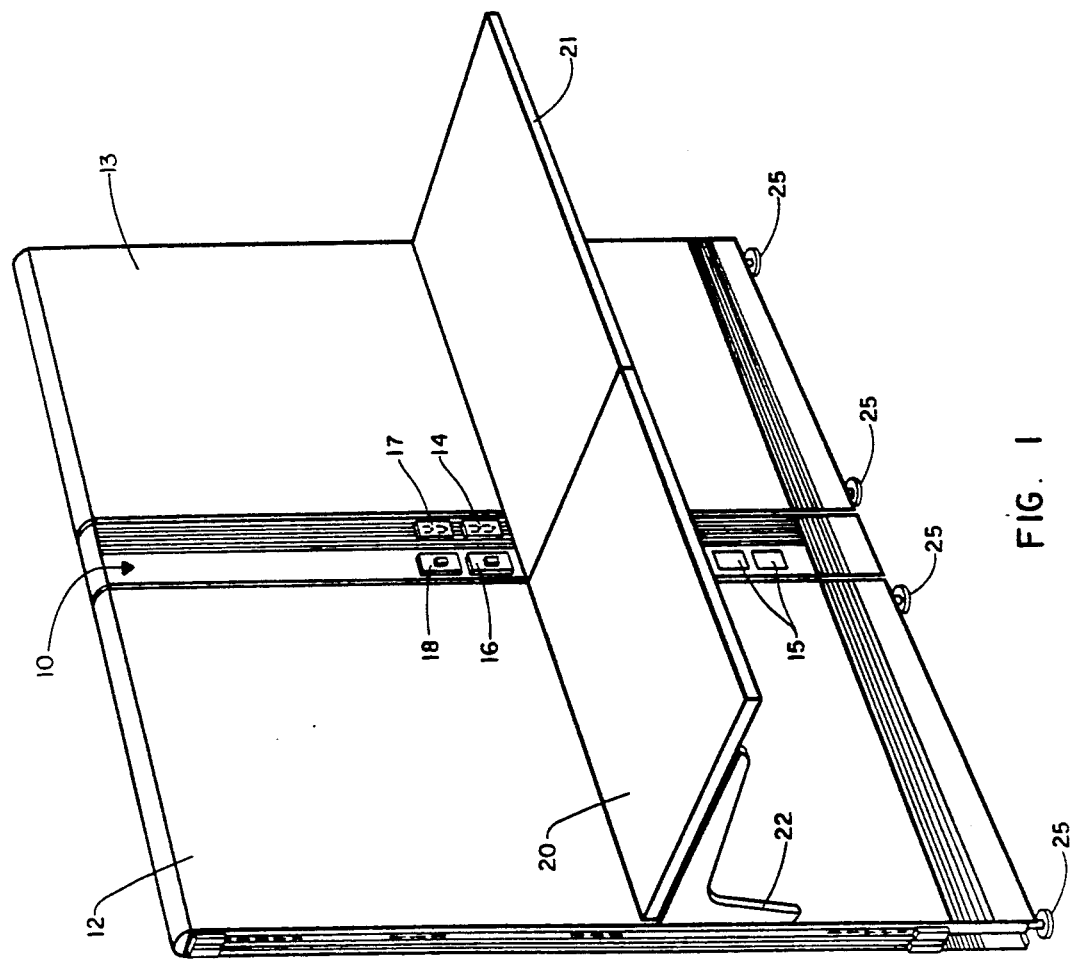
FIG. 1 is a perspective view of a power panel according to the invention disposed between adjacent standard wall panels.

FIG. 1 is a perspective view of an illustrative power panel 10 connected between a pair of freestanding wall panels 12 of a space-divider system. The power panel is of a limited width, e.g., six inches, so that it may be readily integrated into a space-divider wall system in an aesthetically pleasing manner. A power panel may be positioned at one end or both ends of a standard wall panel without modification of the wall panel. The wall panels, which are often in standard sizes, e.g., 36, 42, 48 inches, may be extended by a standard 6-inch-wide power panel to form an overall structure compatible with other system dimensions. The power panel 10 may also be conveniently positioned adjacent a power pole to provide a power pole interface.

Figure 2:
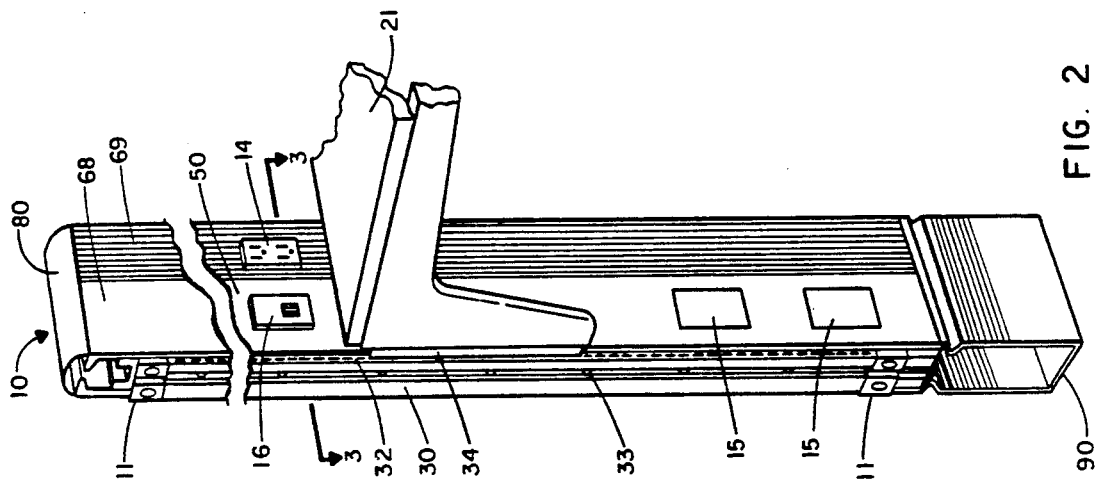
FIG. 2 is a fragmentary perspective view of the power panel of FIG. 1.
Figure 7:
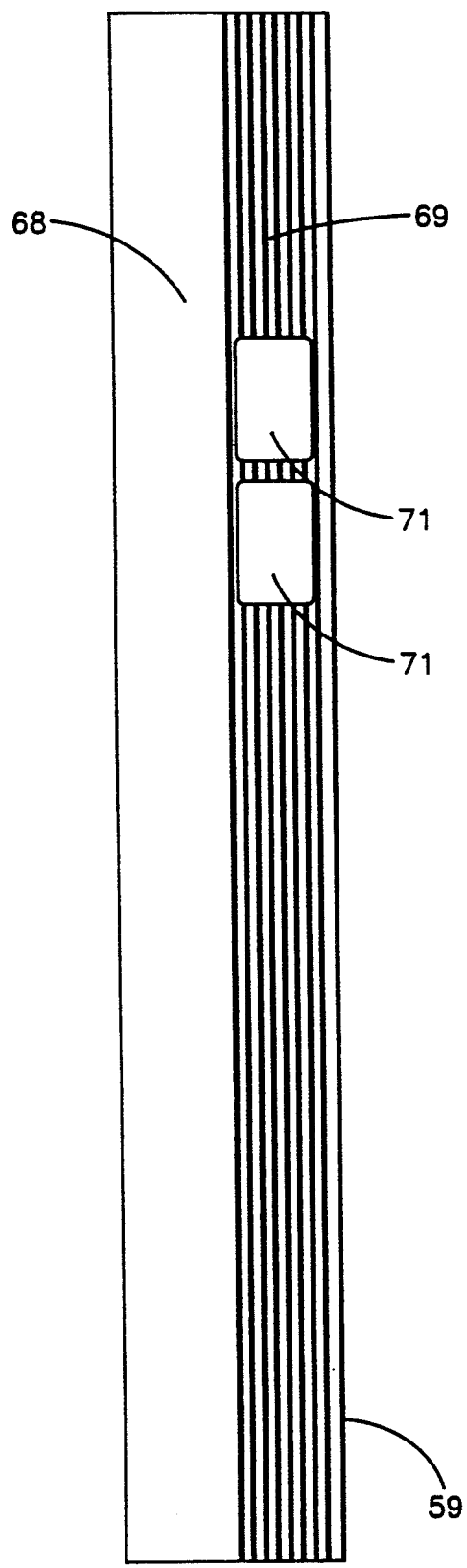
FIGS. 7 and 8 are alternate embodiments of covers for the power panel.
Figure 8:
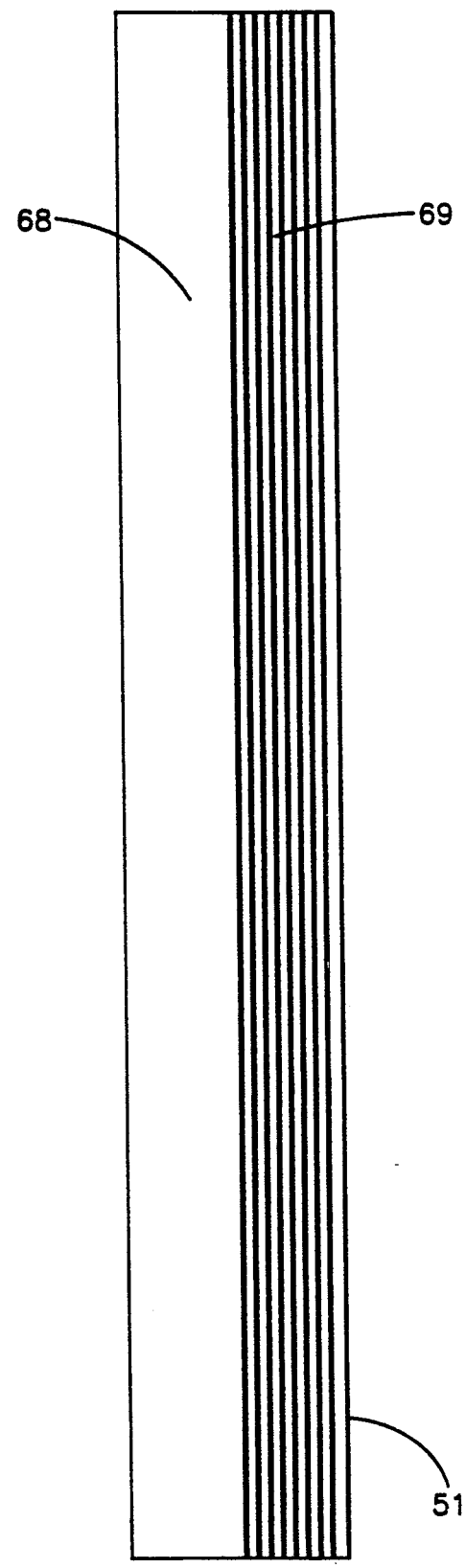

In the embodiment shown in FIGS. 1 and 2, the power panel 10 is provided with a standard duplex electrical outlet 14 and a communication outlet 16 on the front surface of the panel and a plurality of knock-out panels 15 are provided in which communication receptacles may be installed at various elevations along the front surface of the panel. A second surface, which is an essentially mirror image of the front surface, is provided on the opposite side of the panel which, for the purposes of this description, is referred to as the rear of the panel. The front and rear covers are removable, and alternate cover configurations are available. One of the sides may not require any outlet, in which case a plain cover, without openings or knock-out panels, is used. Such a panel is shown at 51 in FIG. 8. In another configuration, only an electrical outlet may be required. In such a case, a panel such as shown at 59 in FIG. 7, provided with electrical receptacle opening 71, may be used.

The thickness of the power panel 10 is the same as standard wall panels, e.g., approximately two inches, and electrical and communication outlets can be provided on both the front and the rear of the panel in a back-to-back relation. The electrical outlet 14 and communication outlet 16 may be positioned at waistline level above work surface 21. The work surface 21 may be supported on adjacent wall panel 13 at one end and on power panel 10 at the other end and is aligned with work surface 20 supported on the other adjacent wall panel 12. The work surfaces are attached to the panels in a standard fashion such as by means of bracket 22 visible in the perspective view of FIG. 1. Wall panels 12 are supported at their lower ends by means of standard support legs 25. The power panel and the adjacent wall panels are each provided with standard slotted rails and the power panel may be connected to adjacent wall panels in a standard fashion by means of conventional wedge blocks and draw block connectors which connect the panels together. An example of a suitable panel-to-panel connector is disclosed in the U.S. Pat. to Propst et al., No. 3,517,467, issued Jun. 30, 1970, which is incorporated herein by reference.

FIG. 2 is a perspective view of the power panel 10, showing slotted rails 30 having a plurality of slots 32, and wedge blocks 11, used to connect the power panel 10 to adjacent wall panels. The slotted rails 30 are fastened to an internal frame structure of the power panel by means of standard fasteners 33. Work surface 21 is attached to slotted rails 30 in a standard fashion by means of brackets 34 having hooks which engage selected ones of the slots 32.

Figure 3:
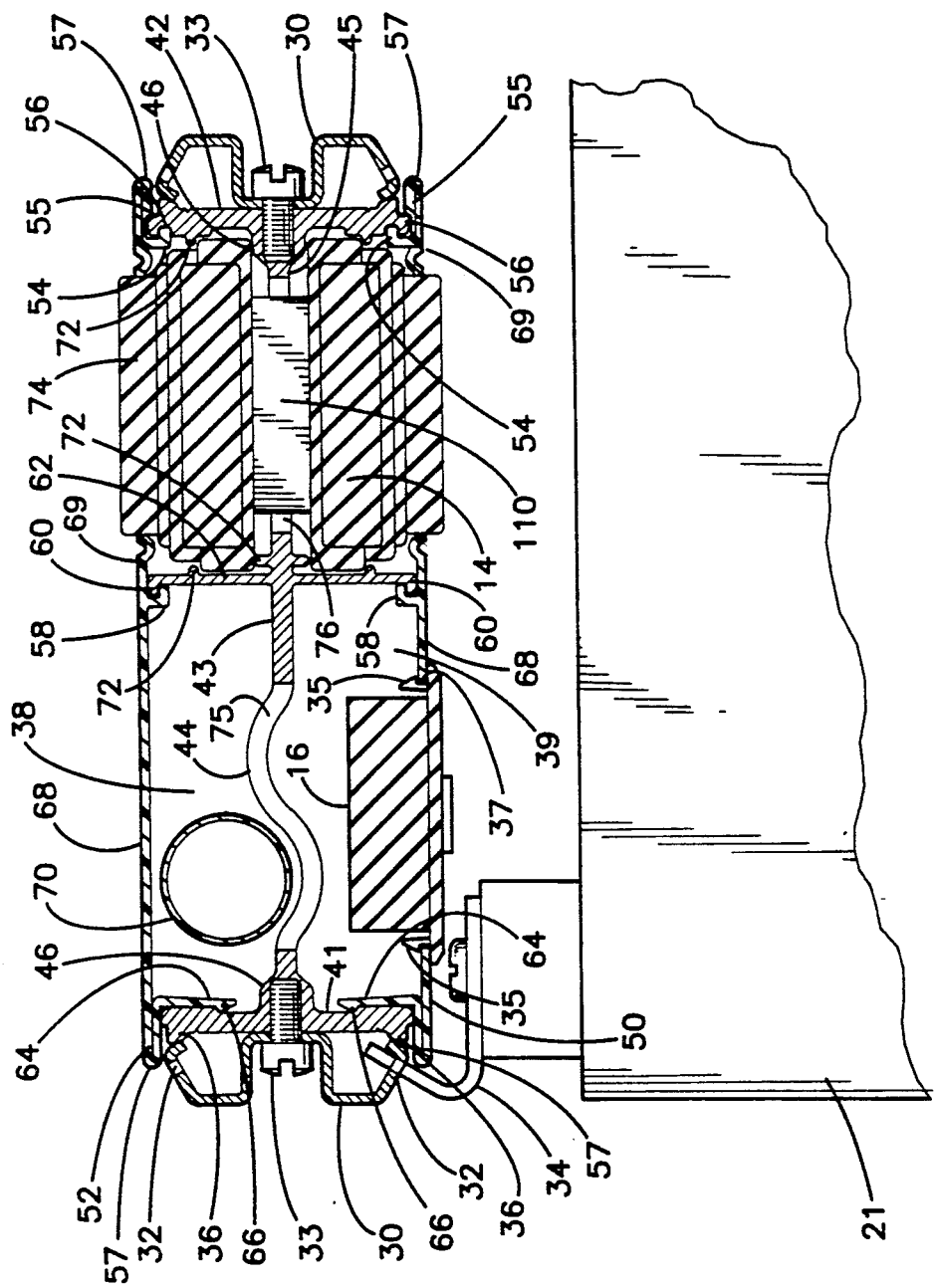
FIG. 3 is a cross-sectional view of the power panel along line 3—3 of FIG. 2.

A cross section of the power panel 10 is shown in FIG. 3, showing the substantially I-beam-shaped internal frame structure, including end plates 41 and 42 and a centrally disposed, interconnecting web 43 provided with enlarged sections 46. The slotted rails 30 are attached to the I-beam frame structure by means of attachment screws 33 extending through end plates 41, 42 and into enlarged sections 46 of the web 43.

Referring further to FIGS. 2 and 3, the power panel 10 is provided with a removable front cover 50 and a removable rear cover 52. The covers are each provided with flanges 54 engaging flanges 56 of end plate 42. Flanges 58 engage flanges 60 on a centrally positioned rib member 62 integral to web 43. Covers 50 and 52 are further provided with spring clips 64 engaging flanges 66 of end plate 41 to facilitate removal of the covers. Alternatively, instead of flanges 54 and 58, spring clips may also be used to accomplish the attaching function. As will be apparent from the drawing, web 43 forms front and rear inner spatial areas with front cover 50 and rear cover 52, respectively. Furthermore, rib member 62 further divides the front and rear spatial areas into two physically separate spatial areas, providing physical separation between electrical and communication wiring for safety purposes and to reduce electrical radiation interference. The removable panels 50, 52 provide a lay-in capability by providing ready access to the spatial areas for installation and receptacle rearrangement.

Covers 50 and 52 are each provided with a section 68 having an unmarked outer surface and a marked section 69 having a grooved surface. The unmarked smooth surface and the marked grooved surface are for symbolic purposes. The smooth surface 68 identifies the spatial areas designated for communication wiring and receptacles, and the grooved surface identifies the spatial areas designated for electrical power wiring and receptacles. The same smooth and grooved surfaces 68 and 69 are incorporated in covers 59 and 51, shown in FIGS. 7 and 8, respectively. Cover 59 has adjacent continuous smooth and grooved surfaces, while on cover 51, the grooved surface is shown to be discontinuous at opening 71. In a similar manner, the surfaces of cover 50 are discontinuous at receptacles 14 and 16 and at knock-out panels 15. Covers not provided with knock-out panels may be readily adapted to accommodate communication receptacles at desired locations by cutting an opening in the cover.

The spatial areas 38 and 39, shown in FIG. 3 and covered by the smooth sections 68, can also be used to accommodate a vertically extending feeder cable or wiring conduit 70 adjacent an offset, S-shaped, curved section 44 of the web 43. The section 44 is curved to an extent sufficient to accommodate feeder cables or conduits of greater diameter without expanding the thickness of the power panel beyond that of adjacent wall panels. The same advantage may be obtained by a rectangular-shaped offset or the like, instead of the S-shaped, curved section shown in the drawing. FIG. 3 shows a single conduit 70 in spatial area 38 on one side of the curved section 44. A second conduit or cable can be readily accommodated in spatial area 39 on the opposite side of the curved section 44. When a spatial area, i.e., 38, 39, is not occupied by a conduit, communication receptacles can be accommodated. Cover section 68 covering spatial area 39 is provided with an opening 37 to accommodate communication receptacle 16. Curved section 44 of web 43 is provided with openings 75 in register with opening 37 and each of the knock-out panels 15. Since communication receptacles are used for a variety of purposes and may have non-standard dimensions, the openings 75 are provided in the web 43 to allow for receptacles which need a space greater than that provided between the web 43 and panels 50 and 52. A variety of different communication receptacles may be accommodated in opening 37 by the use of various standard communication receptacle adapters. The covers, e.g., 50, 52, may be covered by a decorative material as desired. To facilitate application of such material, the covers, e.g., 50, 52, may initially be extruded with straight ends which are subsequently folded over to form folded edges 57.

End plate 42, the straight portion 45 of web 43, and rib 62 are each provided with vertically extending protuberances 72 for engagement with the housing of the electrical receptacles 14 and 74. The protuberances prevent horizontal movement of the receptacles 14, 74 during insertion and removal of electrical plugs, while allowing movement in the vertical direction for removal and installation. A spring clip or the like may additionally be provided for retaining the receptacles 14 and 74.

FIG. 3 shows a communication receptacle 16 extending through an opening 37 in cover 68. A communication receptacle such as receptacle 16 may extend into the opening 75 if necessary. The receptacle 16 is supported in the opening 37 by means of spring clips 35. Electrical receptacles 14 and 74 are both connected to a raceway 110 supported in an opening 76 in the straight portion 45 of web 43. The raceway 110, described further herein with respect to FIGS. 9 and 10, serves to support receptacles 14 and 74 in a vertical direction and to provide electrical power to the receptacles. The raceway 110 is provided with a plurality of wires and terminals representing different electrical circuits. For example, in one embodiment, the connector is provided with eight electrical wires and terminals. Four of these are positive terminals, two are common terminals, and two are ground terminals such as a common ground and an isolated ground, for various electrical applications. The various circuit combinations provided by the connector are available by the use of an outlet receptacle having the appropriate terminal arrangement for engagement with the raceway 110.

Figure 6:
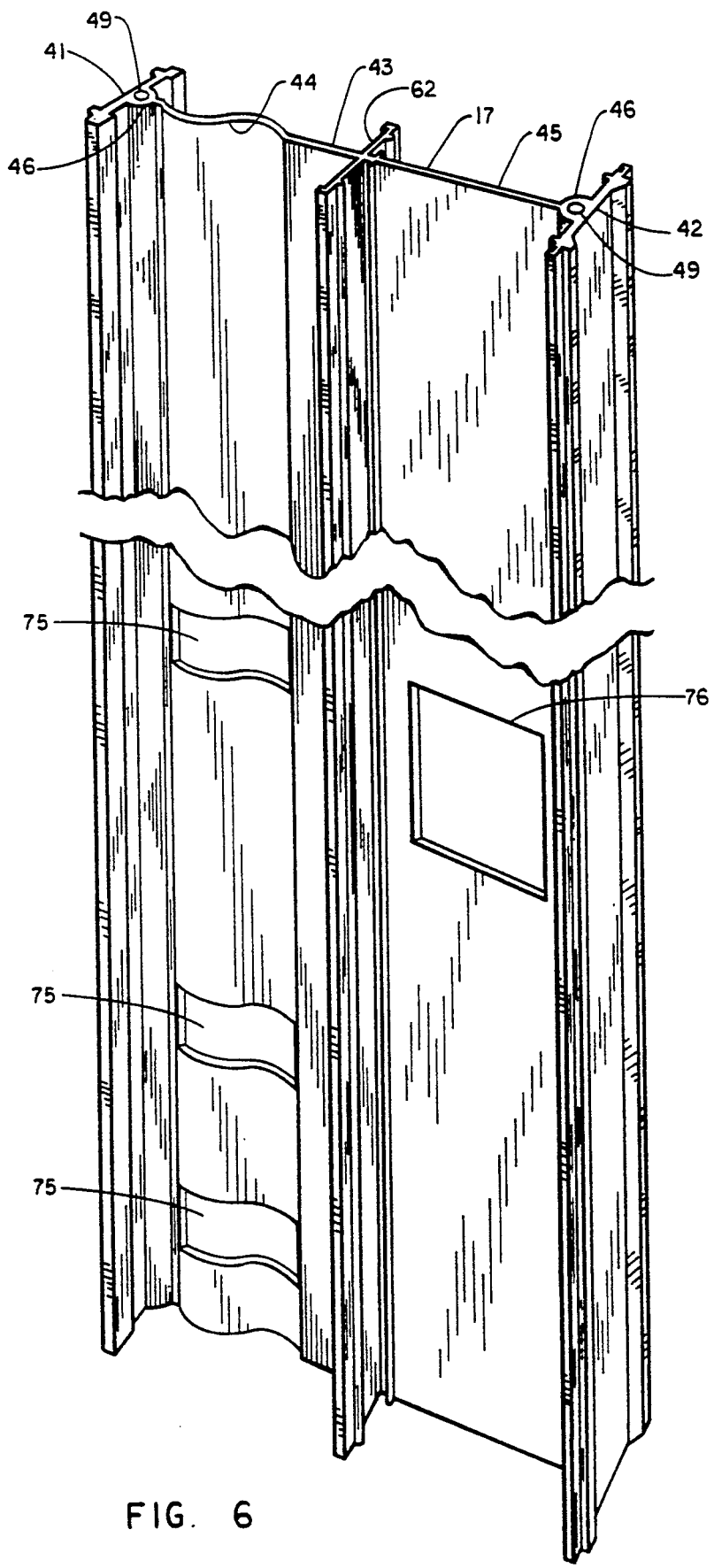
FIG. 6 is a fragmentary perspective view of the frame structure of the power panel of FIG. 2.

FIG. 4 is an enlarged fragmentary left side elevation of the upper portion of the power panel 10, which is provided with an upper cap 80 having spring clips 86 engaging flanges 84. Flanges 84 are integral to a U-shaped metallic bracket 82 which is fastened by means of fasteners 83 to the top of the internal frame structure of power panel 10. FIG. 6 shows the frame structure 17 in perspective view including holes 49 in enlarged sections 46 of web 43. The holes 49 are provided for engagement with fasteners 83. The U-shaped bracket and cap 80 together form a case for containing electrical wiring extending across the top of the power panel 10 and from panel to panel.

Figure 11:
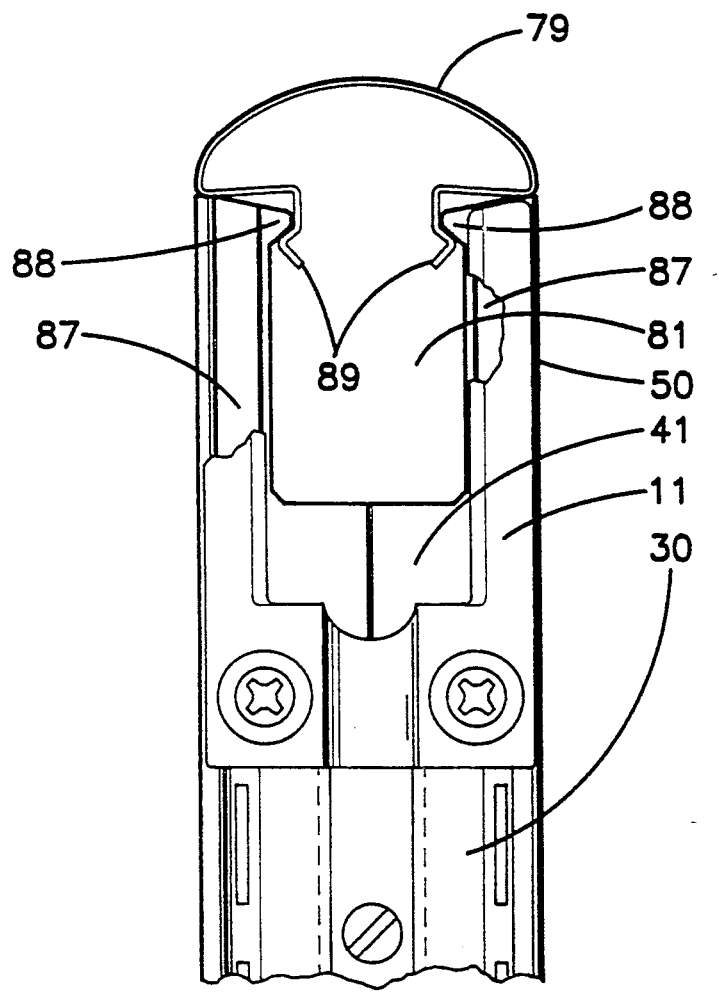
FIG. 11 is an enlarged fragmentary left side elevation of an alternate embodiment of the upper portion of the power panel of FIG. 2.

FIG. 11 shows an alternate embodiment of the upper portion of the power panel 10. In this embodiment, the side portions of end plates 41 and 42 are extended beyond the top edge of interconnecting web 43, and a U-shaped opening is defined above the upper edge of the interconnecting web to accommodate electrical wiring. FIG. 11 shows a left side elevation of the upper portion of end plate 41 with extension sections 87 defining an U-shaped opening 81 therebetween. A cap 79 covers the spatial area defined by the U-shaped opening. Spring clips 89 engage flanges 88 of extensions 87 to retain the cap 79 in place. The spatial area defined by the U-shaped metallic bracket 82 or by extensions of end plates 41, 42 provides a raceway for electrical and communication wiring which may be connected to receptacles in the power panel, may extend horizontally to an adjacent panel, or may extend vertically to a lower raceway area. A power pole may be attached adjacent the power panel in a fashion similar to a wall panel, and electrical power may be provided through the spatial area along the upper edge of the power panel. Similarly, wiring may be provided to the upper edge of the power panel from a power pole extending from a ceiling connection to the top of the power panel. Other configurations may be envisioned in which a power pole may extend along the front or rear sides of the power panel.

FIG. 5 is an enlarged fragmentary left side elevation of the lower portion of power panel 10. The power panel is provided with a lower cover 90 having sections 91 provided with a smooth outside surface, and sections 92 provided with grooved surfaces for decorative purposes. The cover 90 is provided with flanges 93 having thickened inwardly-extending edges 99 which are removably engaged and received by spring clips 94. Spring clips 94 are integral to a metal plate 95 which is attached to the frame structure 17 by means of fasteners 96. The fasteners 96 extend into holes in the bottom of the structure 17 (not shown in the drawing) in enlarged sections 46 of web 43, and generally in alignment with holes 49 shown in FIG. 6. In another embodiment, slots shaped to accommodate flanges such as flanges 93 may be incorporated in the extruded aluminum frame 17 to avoid the need for the separately manufactured metal plate 95. Electrical and communication wiring from wall panels adjacent to power panel 10 can be conveniently extended between the wall panels through the raceways formed by the spatial areas defined above and below the frame structure of power panel 10. Receptacles in power panel 10 can be selectively connected to wiring from either of these raceways. Ceiling-provided feeder cables may be brought down to the lower raceway, and floor-provided feeder cables may be brought up to the upper raceway via power panel 10 in the area adjacent the curved section 44 of web 43, as described earlier herein. Feeder cables may also be extended in one of the two electrical power spatial areas when no electrical outlet receptacle is installed therein.

Figure 9:
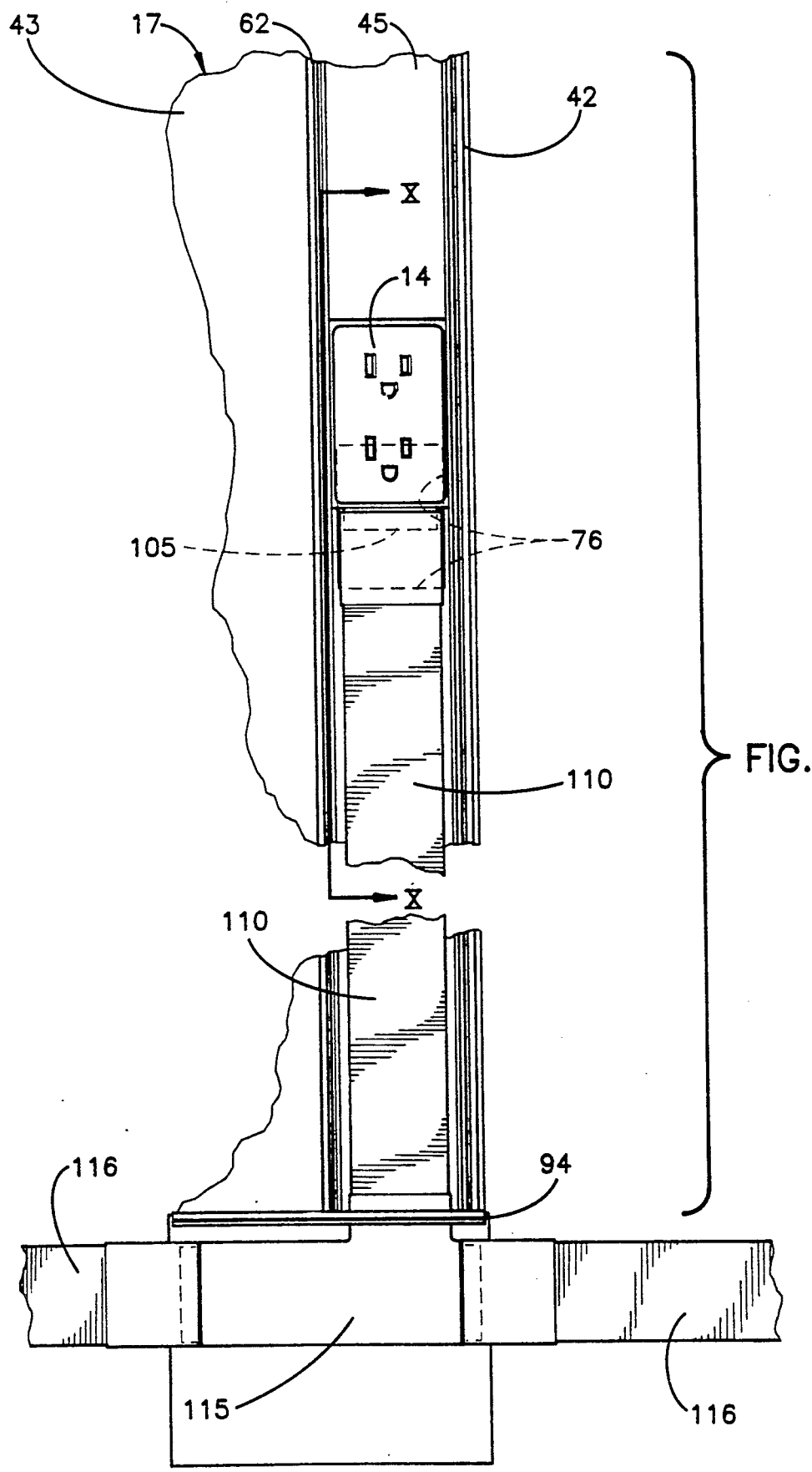
FIG. 9 is a fragmentary frontal view showing electrical connectors in the power panel.

FIG. 9 is a fragmentary frontal view of the frame structure 17 without its front cover and lower raceway cover. FIG. 9 shows a receptacle 14 disposed between central rib 62 and end plate 42. As discussed earlier, protuberances on the rib 62 and end plate 42 prevent horizontal movement of the receptacle 14. The receptacle 14 and the corresponding receptacle 74 on the opposite side of the power panel are supported in the vertical direction on a rectangularly-shaped metallic raceway 110 supported in opening 76 in section 45 of the interconnecting web 43. Raceway 110 has an electrical connector formed integral thereto for engagement with an extension member 105 of receptacle 14. In this manner, electrical connection is established between wiring in raceway 110 and receptacle 14. Raceway 110 extends from receptacle 14 down to the lower portion of power panel 10 to a horizontally extending section 115 which is an integral part of the raceway 110. Section 115 interfaces with raceways 116 from adjacent panels in a standard fashion and provides a through connection between raceways 116 as well as connection to receptacles 14 and 74. As discussed earlier, raceway 110 may be provided with a plurality of terminals representing several different circuit combinations, and different circuit configurations may be obtained by selecting a proper terminal configuration for the receptacles. The raceways 116 may be rigid rectangular raceways or extendable cables or conduits to facilitate extension from adjacent panels to power panel 10. Similarly, section 15 may be provided with extendable end portions to facilitate extension into adjacent panels. Such extendable cables or conduits are well known and may be a commercially available extendable, flexible conduit or a festoon cable provided with sufficient slack to allow the cable to be extended the required distance.

An alternative arrangement uses a "pigtail" or flexible conduit to connect receptacles 14 and 74 to an adjacent panel. Such a connection is advantageous, for example, when no through connection between adjacent panels is required.

Figure 10:
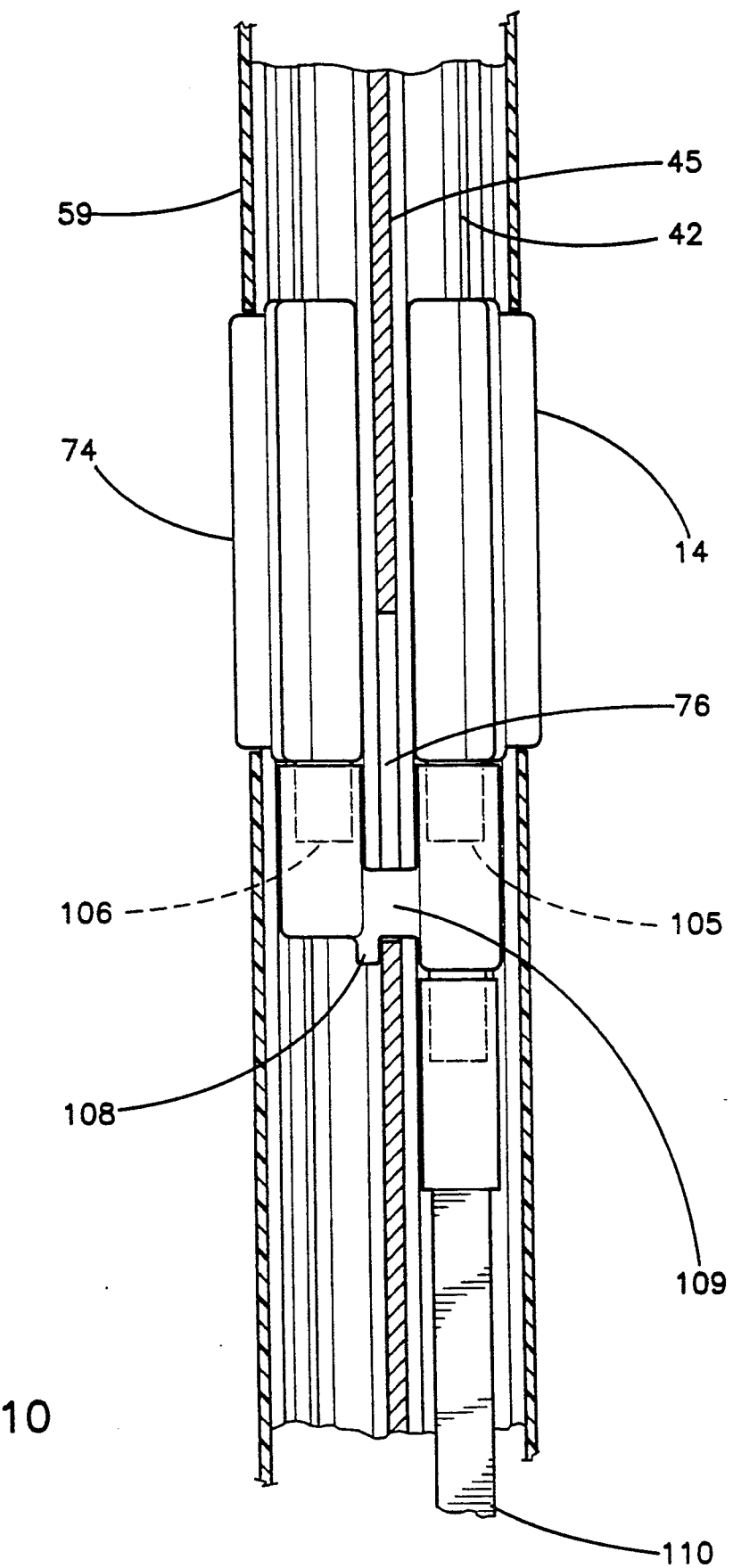
FIG. 10 is a sectional view along line X—X of FIG. 9.

FIG. 10 is a sectional view along line X—X of FIG. 9. FIG. 10 shows two receptacles 14 and 74 disposed in a back-to-back relation and supported by raceway 110. Receptacle 74 is provided with an extension member 106, corresponding to extension member 105 of receptacle 14, extending into raceway 110. Raceway 110 comprises an integral crossover section 109 supported in opening 76. A flange portion 108 of raceway 110 extends below the lower edge of opening 76 and serves as a retainer for raceway 110. In this manner, a single raceway 110 provides electrical connection to two separate receptacles disposed in a back-to-back relation on opposite sides of the section 45 of web 43. A similar structure may be used even when the receptacles are not aligned in a back-to-back relationship.

The invention thus provides a panel through which electrical and communication wiring can be carried from the top to the bottom thereof, and by which electrical and communication wiring can be accessed at one or both sides thereof at convenient locations. The snap-fit removable covers provide easy access to the wiring. Furthermore, there is an integral separation of communication and power wiring within the panel. The framework is structural in nature and formed by an extruded shape which needs little fabrication to be complete for installation. The power panel is relatively light, cost effective, functional and aesthetically pleasing.

It will be understood that the above-described embodiments are only illustrative of the invention and that numerous other configurations can be devised by those skilled in the art without departing from the spirit and scope of the invention.

What is claimed is:

1. A power panel arrangement for use in a space-divider wall panel system, comprising:
    a frame structure;
    a frontal face cover and a rear face cover supported on said frame structure;
    said frame structure comprising first and second vertically extending end plates and a web interconnecting said end plates and extending in a generally vertical direction, said frame structure defining front and rear spatial areas between said web and said front and rear covers for accommodating frontwardly- and rearwardly-facing outlet receptacles in said spatial areas;
    a vertically extending rib member extending from said web to at least one of said front and said rear covers, thereby dividing said at least one of said front and rear inner spatial areas into a pair of physically separated inner spatial areas for accommodating electrical power wiring on one side of said rib member and communication wiring on another side of said rib member, whereby said power panel arrangement provides both power and communication wiring in a single structure while maintaining physical separation therebetween;
    an electrical outlet receptacle mounted in at least one of said spatial areas; and
    an opening in one of said covers in register with said outlet receptacle to provide access thereto.

2. The arrangement in accordance with claim 1 wherein said end plates and said rib member are formed integral with said web.

3. The arrangement in accordance with claim 2 wherein said integral structure is formed from extruded aluminum.

4. The arrangement in accordance with claim 1 wherein said web further comprises a straight section and an offset section, said offset section generally shaped to accommodate a vertically extending feeder cable having a diameter greater than the linear distance between said straight section of said web and one of said covers.

5. The arrangement in accordance with claim 4 wherein said rib member defines inner spatial areas including said offset section.

6. The arrangement in accordance with claim 4 wherein said covers comprise predefined areas for accommodating receptacles and said offset section of said web comprises openings in register with certain of said predefined areas, wherein receptacles may be accommodated having portions thereof extending into said openings.

7. The arrangement in accordance with claim 2 wherein said frame structure has a top edge, and further comprising a U-shaped support bracket disposed along said top edge of said frame and having generally vertically extending side members defining a spatial area therebetween for supporting electrical conductors therein.

8. The arrangement in accordance with claim 7 wherein said U-shaped support bracket has a bottom member interconnecting said side members, wherein said web comprises enlarged areas, said arrangement further comprising fasteners extending through said bottom portion and into said enlarged areas.

9. The arrangement in accordance with claim 7 wherein said front and rear covers extend vertically beyond said top edge of said frame structure.

10. The arrangement in accordance with claim 7 wherein said side members comprise flanges formed near an upper edge of each of said side members and extending inwardly from said side members and wherein said arrangement further comprises a cap for covering said spatial area defined between said side members and spring clip members on said cap engaging said upper flanges.

11. The arrangement in accordance with claim 1 wherein said frame structure comprises a lower edge and said arrangement further comprises a support bracket attached to said lower edge comprising spring clip members and a generally U-shaped lower cover having side walls extending below said lower edge, said side walls having flanges along upper portions of said side walls for engaging said spring clip members.

12. The arrangement in accordance with claim 1 wherein said end plates comprise outer walls and said arrangement comprises vertically extending attachment rails mounted on said outer walls for mounting accessories to said arrangement.

13. The arrangement in accordance with claim 12 wherein said attachment rails comprise mounting slots for receiving support brackets, whereby a work surface having support brackets can be attached to said attachment rails.

14. The arrangement in accordance with claim 1 wherein each of said end plates comprises a plurality of attaching flanges and said front and rear covers each comprise a receiving flange for engaging an attaching flange on one of said end plates and a spring clip for engaging an attaching flange on another of said end plates, whereby said front and said rear covers can be readily removed and replaced for ease of access to said inner spatial areas.

15. The arrangement in accordance with claim 1 and further comprising a plurality of attaching flanges on said end plates and said rib member adjacent said covers, each of said covers comprising a receiving flange for engagement with an attaching flange on one of said end plates and a spring clip for engagement with an attaching flange on another of said end plates and a receiving flange for engagement with said attaching flanges of said rib member.

16. The arrangement in accordance with claim 1 wherein said power panel comprises a lower raceway area adjacent a lower edge of said panel and further comprising an electrical connector housing extending in opposing directions for connection to electrical wiring extended from adjacent panels and having an electrical connection to said mounted receptacle.

17. The arrangement in accordance with claim 1 wherein said web extends in a direction generally parallel to said front and rear face covers.

18. The arrangement in accordance with claim 2 and further comprising:
   an interchangeable set of covers adapted to removably mount on said frame structure, said set comprising a first cover having an outer surface continuous in the vertical direction, a second cover having an outer surface with an opening communicating with one portion of said spatial area for accommodating electrical power wiring and a third cover having an outer surface with an opening communicating with a second portion of said spatial area for accommodating communication wiring;
   whereby said first, second and third interchangeable covers can mount to said frame structure and accommodate different functional configurations of said power panel.

19. A power panel arrangement for use in a space-divider wall panel system, comprising:
   a frame structure;
   a frontal face cover and a rear face cover supported on said frame structure;
   said frame structure comprising first and second vertically extending end plates and a web interconnecting said end plates and extending in a generally vertical direction, said frame structure defining front and rear spatial areas between said web and said front and rear covers for accommodating frontwardly- and rearwardly-facing electrical outlet receptacles in said spatial areas;
   an electrical outlet receptacle mounted in at least one of said spatial areas;
   an opening in one of said covers in register with said outlet receptacle to provide access thereto;
   said end plates comprising outer walls and said web comprising an enlarged section adjacent said end plates; and
   vertically extending attachment rails mounted on said outer walls for mounting accessories to said arrangement, and attached to said end plates by fasteners extending into said enlarged sections.

20. A power panel arrangement for use in a space-divider wall panel system, comprising:
   a frame structure;
   a frontal face cover and a rear face cover supported on said frame structure;
   said frame structure comprising first and second vertically extending end plates and a web interconnecting said end plates and extending in a generally vertical direction, said frame structure defining front and rear spatial areas between said web and said front and rear covers for accommodating frontwardly- and rearwardly-facing electrical outlet receptacles in said spatial areas;
   an electrical outlet receptacle mounted in at least one of said spatial areas; and
   an opening in one of said covers in register with said outlet receptacle to provide access thereto;
   said end plates comprising inner surfaces and said inner surface of one of said end plates and an area of said web adjacent said one end plate each comprise retaining protuberances for retaining an electrical outlet receptacle housing.

21. The arrangement in accordance with claim 20, and wherein said rib member has opposing surfaces opposite said inner surfaces of said end plates, and protuberances for retaining an electrical outlet receptacle housing on one of said surfaces of said web member opposite said one surface of said one end plate.

22. A power panel arrangement for use in a space-divider wall panel system, comprising:
   a frame structure;
   a frontal face cover and a rear face cover supported on said frame structure;
   said frame structure comprising first and second vertically extending end plates and a web interconnecting said end plates and extending in a generally vertical direction, said frame structure defining front and rear spatial areas between said web and said front and rear covers for accommodating frontwardly- and rearwardly-facing electrical outlet receptacles in said spatial areas;
   an electrical outlet receptacle mounted in at least one of said spatial areas; and
   an opening in one of said covers in register with said outlet receptacle to provide access thereto;
   at least one of said covers comprising a vertically extending marked surface area having visually discernable surface markings indicative of a functional designation of a vertically extending spatial area covered by said marked surface area.

23. The arrangement in accordance with claim 22 wherein said marked surface area is discontinuous at said opening.

24. The arrangement in accordance with claim 23 wherein another of said covers comprises a continuous marked surface area having visually discernable surface markings and extending over a vertically extending spatial area between said web and said other cover and opposing said at least one spatial area.

25. A power panel arrangement for use in a space-divider wall panel system, comprising:
   a frame structure;
   a frontal face cover and a rear face cover supported on said frame structure;
   said frame structure comprising first and second vertically extending end plates and a web interconnecting said end plates and extending in a generally vertical direction, said frame structure defining front and rear spatial areas between said web and said front and rear covers for accommodating frontwardly- and rearwardly-facing electrical outlet receptacles in said spatial areas;
   an electrical outlet receptacle mounted in at least one of said spatial areas;
   an opening in one of said covers in register with said outlet receptacle to provide access thereto; and
   an opening in said web and an electrical connector supported in said opening having connector terminals connected to said mounted receptacle.

26. The arrangement in accordance with claim 25 wherein said arrangement further comprises an electrical outlet receptacle mounted in another of said spatial areas, and wherein said connector further comprises connector terminals connected to said receptacle mounted in said other spatial area.

27. The arrangement in accordance with claim 26 wherein said connector comprises one housing portion supporting one of said receptacles on one side of said web and another housing portion supporting another of said receptacles on another side of said web.

28. The arrangement in accordance with claim 27 wherein said opening in said web has a lower edge and said connector is supported on said lower edge.

29. The arrangement in accordance with claim 27 wherein said one of said housing portions comprises a flange extending downwardly from said lower edge for retaining said electrical connector in said opening.

30. A power panel arrangement for use in a space-divider wall panel system, comprising:
   a frame structure;
   a frontal face cover and a rear face cover supported on said frame structure;
   said frame structure comprising first and second vertically extending end plates and a web interconnecting said end plates and extending in a generally vertical direction, said frame structure defining front and rear spatial areas between said web and said front and rear covers for accommodating frontwardly- and rearwardly-facing electrical outlet receptacles in said spatial areas;
   an electrical outlet receptacle mounted in at least one of said spatial areas; and
   an opening in one of said covers in register with said outlet receptacle to provide access thereto;
   said web comprising a top edge and said end plates each comprising a top section extending beyond said top edge; and
   each of said top sections comprising an opening for accommodating passage of wiring extending from adjacent panels and along said top edge.

* * * * *

UNITED STATES PATENT AND TRADEMARK OFFICE
CERTIFICATE OF CORRECTION

PATENT NO. : 5,129,835

DATED : July 14, 1992

INVENTOR(S) : DeFouw et al.

It is certified that error appears in the above-identified patent and that said Letters Patent is hereby corrected as shown below:

Claim 7, column 10, line 47, "claim 2" should read --claim 1--.

Claim 18, column 11, line 49, "claim 2" should read --claim 1--.

Claim 29, column 14, line 11, claim 27" should read --claim 28--.

Signed and Sealed this

Twelfth Day of October, 1993

Attest:

BRUCE LEHMAN

Attesting Officer

Commissioner of Patents and Trademarks